(12) United States Patent
Doumani et al.

(10) Patent No.: US 9,511,429 B2
(45) Date of Patent: Dec. 6, 2016

(54) BLADE DROP FOR POWER DEVICE AND METHOD OF MANUFACTURING THEREOF

(71) Applicants: Robert Bosch Tool Corporation, Broadview, IL (US); Robert Bosch GmbH, Stuttgart (DE)

(72) Inventors: Robert Doumani, Hoffman Estates, IL (US); Eric Laliberte, Naperville, IL (US); Timothy Szweda, Chicago, IL (US); Mark Talesky, Huntley, IL (US)

(73) Assignees: Robert BoschTool Corporation, Broadview, IL (US); Robert Bosch GmbH, Stuttgart (DE)

( * ) Notice: Subject to any disclaimer, the term of this patent is extended or adjusted under 35 U.S.C. 154(b) by 277 days.

(21) Appl. No.: 14/203,928

(22) Filed: Mar. 11, 2014

(65) Prior Publication Data

US 2014/0260861 A1    Sep. 18, 2014

Related U.S. Application Data

(60) Provisional application No. 61/787,803, filed on Mar. 15, 2013.

(51) Int. Cl.
*B23D 45/06* (2006.01)
*B23D 59/00* (2006.01)
*B27G 19/02* (2006.01)

(52) U.S. Cl.
CPC ........... *B23D 45/065* (2013.01); *B23D 59/001* (2013.01); *B27G 19/02* (2013.01); *Y10T 83/626* (2015.04)

(58) Field of Classification Search
CPC ..... B23D 45/065; B23D 59/001; B23D 47/08; B23D 45/06; B23D 45/067; B27G 19/02; F16P 3/14; F16P 3/148; F16P 3/12; Y10T 83/626;Y10T 83/089; Y10T 83/773; Y10T 83/9372; Y10T 83/081; Y10T 83/9384
(Continued)

(56) References Cited

U.S. PATENT DOCUMENTS

| 1,552,665 A | 9/1925 | Authenrieth |
| 2,044,481 A | 6/1936 | Manley et al. |

(Continued)

FOREIGN PATENT DOCUMENTS

| DE | 4424615 | 1/1996 |
| DE | 20007037 | 7/2000 |
| DE | 202004004463 | 8/2004 |
| DE | 202004012468 | 11/2004 |
| WO | 2004045814 | 6/2004 |

OTHER PUBLICATIONS

Photograph of Mafell Erika 70Ec Pull-Push saw, downloaded Oct. 29, 2009 from http://www.maschinensucher.de/ma2/bilderanzeigen-A600704-1-english.html.
(Continued)

*Primary Examiner* — Ghassem Alie
(74) *Attorney, Agent, or Firm* — Maginot Moore & Beck LLP

(57) ABSTRACT

A table saw in one embodiment a swing arm movable along a swing arm path between a first swing arm position adjacent a latch hold mechanism and a second swing arm position spaced apart from the latch hold mechanism, a blade supported by the swing arm, a charge coupling plate mounted in close proximity to the blade so as to form a capacitor, an actuating device configured to transfer a force to the swing arm when the swing arm is maintained at the first swing arm position resulting in a bias on the latch hold mechanism, and a control system configured to control the actuating device to transfer the force to the swing arm in response to a sensed change in capacitance of the capacitor.

20 Claims, 15 Drawing Sheets

(58) Field of Classification Search
USPC ............ 83/399, 477.2, 564, 508.1, 58, 62.1, 83/477.1, 478, 545, 522.18, 471.2, 102.1, 83/581, 663; 144/384, 391, 427, 154.5, 83/356; 324/688, 661
See application file for complete search history.

(56) References Cited

U.S. PATENT DOCUMENTS

| | | |
|---|---|---|
| 2,054,932 A | 9/1936 | Fleming et al. |
| RE20,687 E | 4/1938 | Grozier |
| 2,236,232 A | 3/1941 | Brescka et al. |
| 2,505,958 A | 5/1950 | Grierson |
| 2,652,863 A | 9/1953 | Grabinski |
| 2,711,061 A | 6/1955 | Fegert |
| 2,719,547 A | 10/1955 | Gjerde |
| 2,729,927 A | 1/1956 | D'Arcey |
| 2,844,173 A | 7/1958 | Gaskell |
| 2,898,893 A | 8/1959 | Rohrer et al. |
| 2,903,848 A | 9/1959 | Mayhew et al. |
| 2,937,672 A | 5/1960 | Gjerde |
| 3,007,501 A | 11/1961 | Mundell et al. |
| 3,013,592 A | 12/1961 | Ambrosio et al. |
| 3,036,608 A | 5/1962 | Weber |
| 3,320,740 A | 5/1967 | Hamkins |
| 3,344,819 A | 10/1967 | Mitchell |
| 3,394,500 A | 7/1968 | Lill et al. |
| 3,444,670 A | 5/1969 | Hungate |
| 3,954,051 A | 5/1976 | Steiniger |
| 4,063,478 A | 12/1977 | Stuy |
| 4,161,272 A | 7/1979 | Brockl |
| 4,184,394 A | 1/1980 | Gjerde |
| 4,192,104 A | 3/1980 | Patenaude |
| 4,241,505 A | 12/1980 | Bodycomb et al. |
| 4,255,995 A | 3/1981 | Connor |
| 4,326,864 A | 4/1982 | Sittler |
| 4,336,733 A | 6/1982 | Macksoud |
| 4,367,665 A | 1/1983 | Terpstra et al. |
| 4,385,539 A | 5/1983 | Meyerhoefer et al. |
| 4,576,072 A | 3/1986 | Terpstra et al. |
| 4,616,447 A | 10/1986 | Haas et al. |
| 4,742,743 A | 5/1988 | Scarpone |
| 4,875,398 A | 10/1989 | Taylor et al. |
| 4,962,685 A | 10/1990 | Hagstrom |
| 5,033,192 A | 7/1991 | Franz et al. |
| 5,123,317 A | 6/1992 | Barnes et al. |
| 5,158,001 A | 10/1992 | Udelhofen et al. |
| 5,181,447 A | 1/1993 | Hewitt |
| 5,231,906 A | 8/1993 | Kogej |
| 5,537,748 A | 7/1996 | Takahashi et al. |
| 5,588,213 A | 12/1996 | Swanberg |
| 5,676,319 A | 10/1997 | Stiggins et al. |
| 5,819,625 A | 10/1998 | Sberveglieri |
| 6,009,782 A | 1/2000 | Tajima et al. |
| 6,036,608 A | 3/2000 | Morris |
| 6,131,629 A | 10/2000 | Puzio et al. |
| 6,139,411 A | 10/2000 | Everts et al. |
| 6,370,997 B1 | 4/2002 | Rugen et al. |
| 6,470,778 B1 | 10/2002 | Kaye, Jr. et al. |
| 6,503,125 B1 | 1/2003 | Harrington |
| 6,530,303 B1 | 3/2003 | Parks et al. |
| 6,536,536 B1 | 3/2003 | Gass et al. |
| 6,736,042 B2 | 5/2004 | Behne et al. |
| 6,796,208 B1 | 9/2004 | Jorgensen |
| 6,813,983 B2 | 11/2004 | Gass et al. |
| 6,826,988 B2 | 12/2004 | Gass et al. |
| 6,834,730 B2 | 12/2004 | Gass et al. |
| 6,857,345 B2 | 2/2005 | Gass et al. |
| 6,877,410 B2 | 4/2005 | Gass et al. |
| 6,880,440 B2 | 4/2005 | Gass et al. |
| 6,920,814 B2 | 7/2005 | Gass et al. |
| 6,922,153 B2 * | 7/2005 | Pierga .................. B23D 45/067 318/16 |
| 6,945,148 B2 | 9/2005 | Gass et al. |
| 6,945,149 B2 | 9/2005 | Gass et al. |
| 6,957,601 B2 | 10/2005 | Gass et al. |
| 6,966,350 B1 | 11/2005 | Gist |
| 6,994,004 B2 | 2/2006 | Gass et al. |
| 6,997,090 B2 | 2/2006 | Gass et al. |
| 7,000,514 B2 | 2/2006 | Gass et al. |
| 7,024,975 B2 | 4/2006 | Gass et al. |
| 7,029,384 B2 | 4/2006 | Steimel et al. |
| 7,055,417 B1 | 6/2006 | Gass |
| 7,077,039 B2 | 7/2006 | Gass et al. |
| 7,093,668 B2 | 8/2006 | Gass et al. |
| 7,098,800 B2 | 8/2006 | Gass |
| 7,100,483 B2 | 9/2006 | Gass et al. |
| 7,121,358 B2 | 10/2006 | Gass et al. |
| 7,137,326 B2 | 11/2006 | Gass et al. |
| 7,171,879 B2 | 2/2007 | Gass et al. |
| 7,197,969 B2 | 4/2007 | Gass et al. |
| 7,210,383 B2 | 5/2007 | Gass et al |
| 7,225,712 B2 | 6/2007 | Gass et al. |
| 7,228,772 B2 | 6/2007 | Gass |
| 7,231,856 B2 | 6/2007 | Gass et al. |
| 7,241,211 B2 | 7/2007 | Baratta |
| 7,284,467 B2 | 10/2007 | Gass et al. |
| 7,290,472 B2 | 11/2007 | Gass et al. |
| 7,290,474 B2 * | 11/2007 | Keller .................. B23D 59/001 192/130 |
| 7,290,967 B2 | 11/2007 | Steimel et al. |
| 7,308,843 B2 | 12/2007 | Gass et al. |
| 7,328,752 B2 | 2/2008 | Gass et al. |
| 7,347,131 B2 | 3/2008 | Gass |
| 7,350,444 B2 | 4/2008 | Gass et al. |
| 7,350,445 B2 | 4/2008 | Gass et al. |
| 7,353,737 B2 | 4/2008 | Gass et al. |
| 7,357,056 B2 | 4/2008 | Gass et al. |
| 7,359,174 B2 | 4/2008 | Gass |
| 7,377,199 B2 | 5/2008 | Gass et al. |
| 7,421,315 B2 | 9/2008 | Gass et al. |
| 7,472,634 B2 | 1/2009 | Gass et al. |
| 7,475,542 B2 | 1/2009 | Borg et al. |
| 7,481,140 B2 | 1/2009 | Gass et al. |
| 7,509,899 B2 | 3/2009 | Gass et al. |
| 7,525,055 B2 | 4/2009 | Gass et al. |
| 7,536,238 B2 | 5/2009 | Gass |
| 7,540,334 B2 | 6/2009 | Gass et al. |
| 7,591,210 B2 | 9/2009 | Gass et al. |
| 7,600,455 B2 | 10/2009 | Gass et al. |
| 7,628,101 B1 | 12/2009 | Knapp et al. |
| 7,654,181 B2 | 2/2010 | Quinlan |
| 7,698,975 B2 | 4/2010 | Peot et al. |
| 7,721,633 B2 | 5/2010 | Gaw |
| 8,065,943 B2 | 11/2011 | Gass et al. |
| 2002/0020265 A1 | 2/2002 | Gass et al. |
| 2002/0025767 A1 | 2/2002 | Chen |
| 2002/0190581 A1 | 12/2002 | Gass et al. |
| 2003/0089212 A1 | 5/2003 | Parks et al. |
| 2003/0131703 A1 * | 7/2003 | Gass .................. B23D 59/001 83/62.1 |
| 2004/0035595 A1 | 2/2004 | Fisher |
| 2004/0159198 A1 | 8/2004 | Peot et al. |
| 2004/0248507 A1 | 12/2004 | Brazell et al. |
| 2005/0166736 A1 | 8/2005 | Gass et al. |
| 2005/0268767 A1 | 12/2005 | Pierga et al. |
| 2006/0042440 A1 | 3/2006 | Quinlan |
| 2006/0201302 A1 | 9/2006 | Schwaiger et al. |
| 2007/0044609 A1 | 3/2007 | Brazell et al. |
| 2007/0074612 A1 | 4/2007 | Yu |
| 2010/0307308 A1 | 12/2010 | Butler |
| 2011/0048194 A1 * | 3/2011 | Groth .................. B23D 45/067 83/58 |
| 2011/0048199 A1 | 3/2011 | Voruganti et al. |
| 2011/0048207 A1 | 3/2011 | Holmes et al. |

OTHER PUBLICATIONS

Amazon website page "Bosch 4100-09 10-Inch Worksite Table Saw with Gravity-Rise Stand"; http://www.amazon.com . . . ; published at least as early as Aug. 10, 2010; (1 page).

(56) References Cited

OTHER PUBLICATIONS

Amazon website page "DeWalt DW745 Heavy-Duty 10-Inch Compact Job-Site Table Saw with 16-Inch Max Rip Capacity"; http://www.amazon.com . . . ; published at least as early as Aug. 10, 2010; (1 page).
Amazon website page "Hitachi C10RB 10-Inch Portable Jobsite Table Saw with Stand"; http://www.amazon.com . . . ; published at least as early as Aug. 10, 2010; (1 page).
Amazon website page "Makita 2704 Contractors 15 Amp 10-Inch Benchtop Table Saw"; http://www.amazon.com . . . : published at least as early as Aug. 10, 2010; (1 page).
Amazon website page "Metabo TS250 10-Inch Table Saw without Stand": http://www.amazon.com . . . ; published at least as early as Aug. 10, 2010; (1 page).
International Search Report in corresponding PCT Application (i.e., PCT/US2011/046876), mailed Nov. 17, 2011 (12 pages).
International Search Report and Written Opinion corresponding to PCT Application No. PCT/US2014/024893, mailed Aug. 7, 2014 (17 pages).

\* cited by examiner

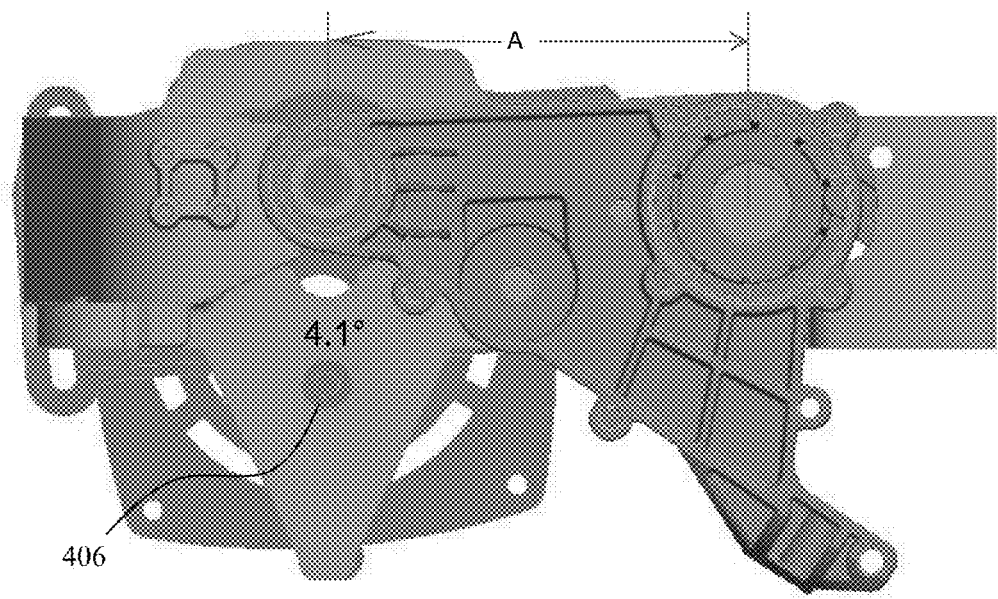
FIG. 17A
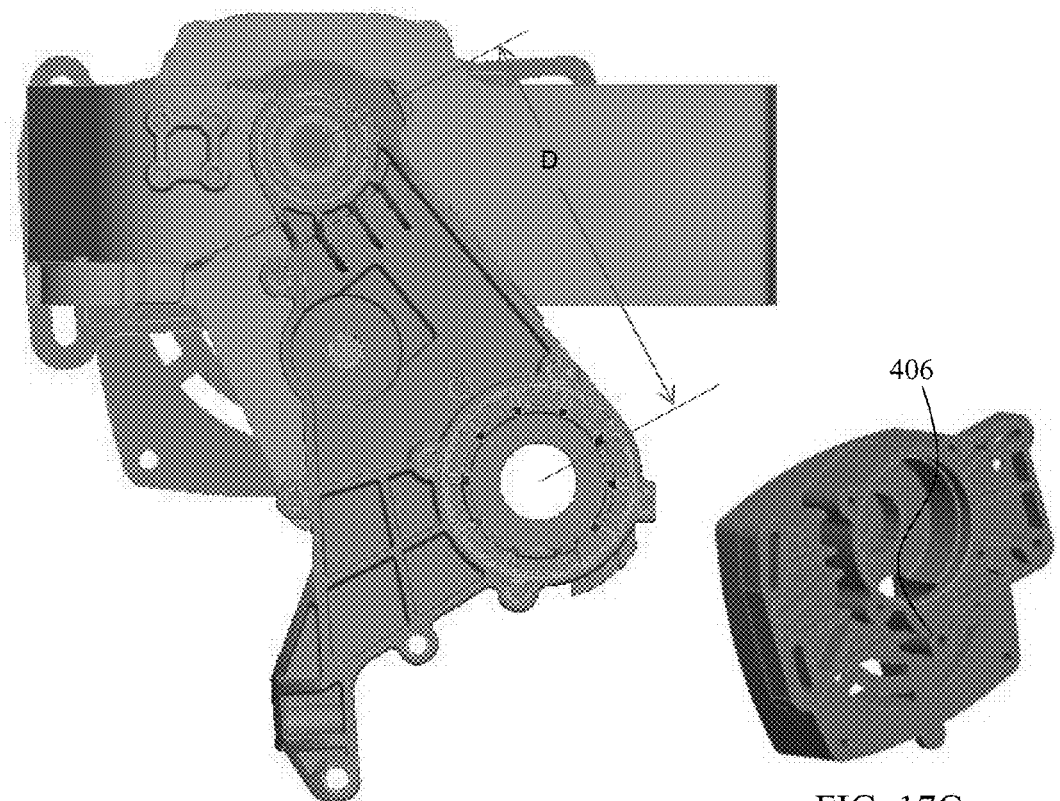
FIG. 17B
FIG. 17C

BLADE DROP FOR POWER DEVICE AND METHOD OF MANUFACTURING THEREOF

This application claims the benefit of U.S. Provisional Application No. 61/787,803 filed Mar. 15, 2013, the entirety of which is incorporated herein by reference.

FIELD

The present disclosure relates to power tools and more particularly to power tools with exposed shaping devices.

BACKGROUND

A number of power tools have been produced to facilitate forming a work piece into a desired shape. One such power tool is a table saw. A wide range of table saws are available for a variety of uses. Some table saws such a cabinet table saws are very heavy and relatively immobile. Other table saws, sometimes referred to as jobsite table saws, are relatively light. Jobsite table saws are thus portable so that a worker can position the table saw at a job site. Some accuracy is typically sacrificed in making a table saw sufficiently light to be mobile. The convenience of locating a table saw at a job site, however, makes job site table saws very desirable in applications such as general construction projects.

All table saws, including cabinet table saws and job site table saws, present a safety concern because the saw blade of the table saw is typically very sharp and moving at a high rate of speed. Accordingly, severe injury such as severed digits and deep lacerations can occur almost instantaneously. A number of different safety systems have been developed for table saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, the blade guards can be removed by a user either for convenience of using the table saw or because the blade guard is not compatible for use with a particular shaping device. By way of example, a blade guard is typically not compatible with a dado blade and must typically be removed when performing non-through cuts.

Table saw safety systems have also been developed which are intended to stop the blade when a user's hand approaches or touches the blade. Various stopping devices have been developed including braking devices which are physically inserted into the teeth of the blade. Such approaches are extremely effective. Upon actuation of this type of braking device, however, the blade is typically ruined because of the braking member. Additionally, the braking member is typically destroyed.

In response to the shortcomings of the above described devices, table saw safety systems have been developed which rapidly move a saw blade or other shaping device below the surface of the work support surface in response to a sensed condition. One such device is disclosed in U.S. Pat. No. 8,297,159, which issued on Oct. 30, 2012, the entire contents of which are herein incorporated by reference.

The system disclosed in the '159 patent is highly effective in moving a saw blade or other shaping device away from a user by moving a swing arm assembly within the saw housing.

In view of the foregoing, it would be advantageous to provide a power tool with movable swing arm that moves more efficiently. It would be further advantageous for a power tool to provide efficient movement of a swing arm while improving accuracy of the swing arm in a latched position.

SUMMARY

In accordance with one embodiment, a table saw includes a swing arm movable along a swing arm path between a first swing arm position adjacent a latch hold mechanism and a second swing arm position spaced apart from the latch hold mechanism, a blade supported by the swing arm, a charge coupling plate mounted in close proximity to the blade so as to form a capacitor, an actuating device configured to transfer a force to the swing arm when the swing arm is maintained at the first swing arm position resulting in a bias on the latch hold mechanism, and a control system configured to control the actuating device to transfer the force to the swing arm in response to a sensed change in capacitance of the capacitor.

In another embodiment, a power tool includes a swing arm movable along a swing arm path between a first swing arm position adjacent a latch hold mechanism and a second swing arm position spaced apart from the latch hold mechanism, a shaping tool supported by the swing arm, a charge coupling plate mounted in close proximity to the shaping tool so as to form a capacitor, an actuating device configured to transfer a force to the swing arm when the swing arm is maintained at the first swing arm position resulting in a bias on the latch hold mechanism, and a control system configured to control the actuating device to transfer the force to the swing arm in response to a sensed change in capacitance of the capacitor.

In a further embodiment, a power device includes a sensor, a swing arm movable along a swing arm path between a first swing arm position adjacent a latch hold mechanism and a second swing arm position spaced apart from the latch hold mechanism, an actuating device configured to transfer a force to the swing arm when the swing arm is maintained at the first swing arm position, and a control system configured to control the actuating device to transfer the force to the swing arm in response to a sensed change in signal of the sensor.

BRIEF DESCRIPTION OF THE DRAWINGS

The accompanying drawings illustrate various embodiments of the present disclosure and together with a description serve to explain the principles of the disclosure.

FIGS. 17A, B, and C depict a pivot belt adjustment configuration.

Corresponding reference characters indicate corresponding parts throughout the several views. Like reference characters indicate like parts throughout the several views.

DETAIL DESCRIPTION OF THE DISCLOSURE

Figure 1:
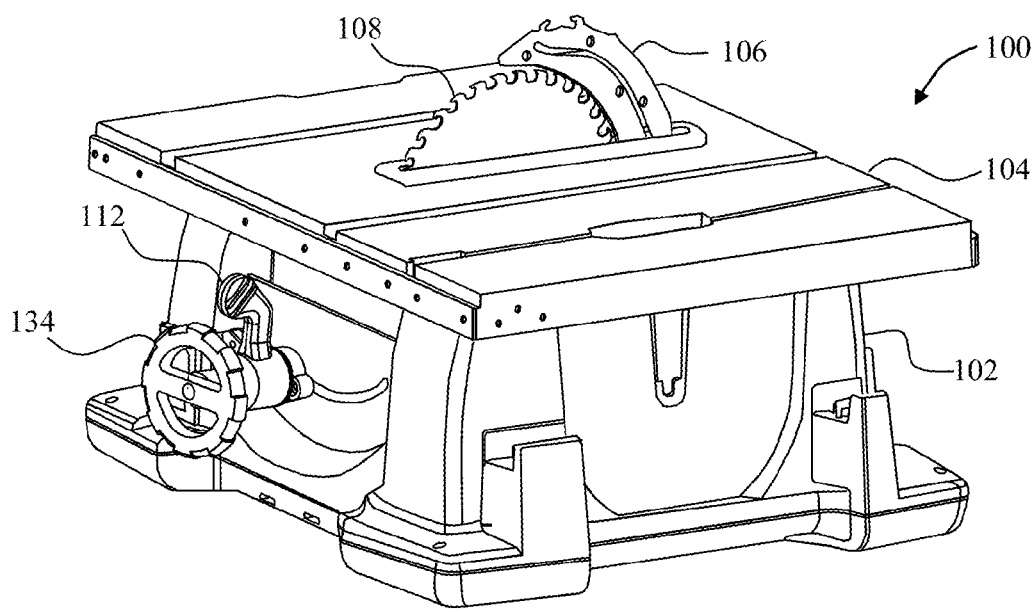
FIG. 1 depicts a perspective view of a table saw incorporating a movable swing arm assembly in accordance with principles of the disclosure.

While the power tools described herein are susceptible to various modifications and alternative forms, specific embodiments thereof have been shown by way of example in the drawings and will herein be described in detail. It should be understood, however, that there is no intent to limit the power tools to the particular forms disclosed. On the contrary, the disclosure is to cover all modifications, equivalents, and alternatives falling within the spirit and scope of the disclosure as defined by the appended claims.

Figure 2:
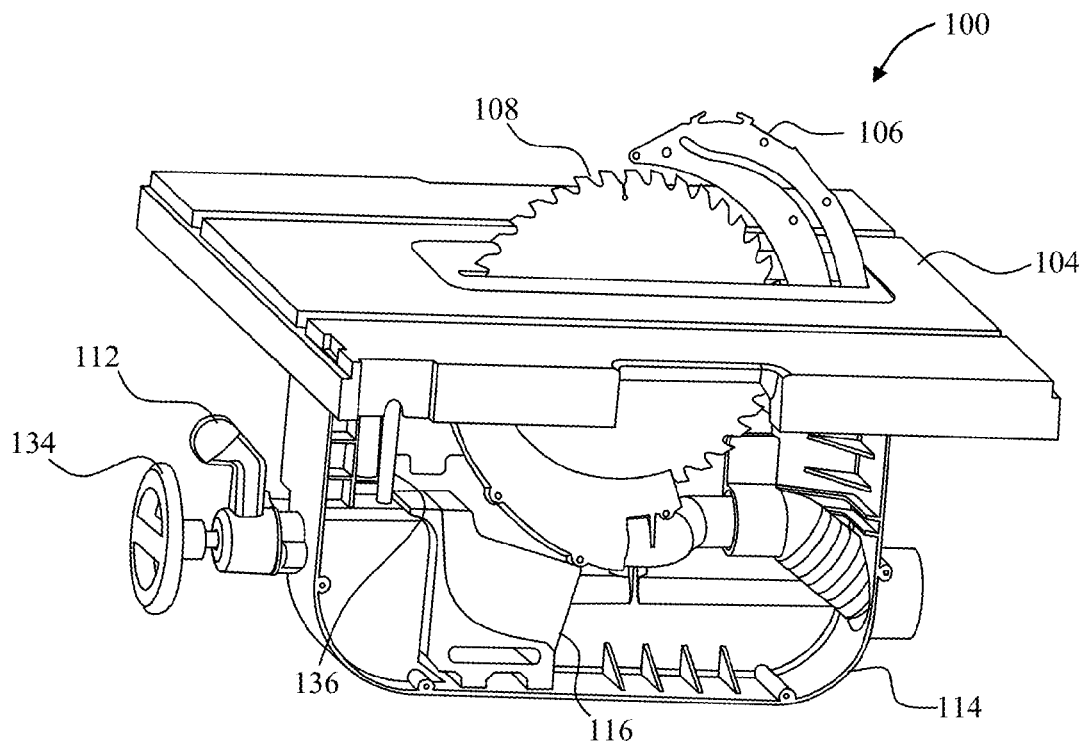
FIG. 2 depicts a perspective view of the table saw of FIG. 1 with the housing removed.
Figure 3:
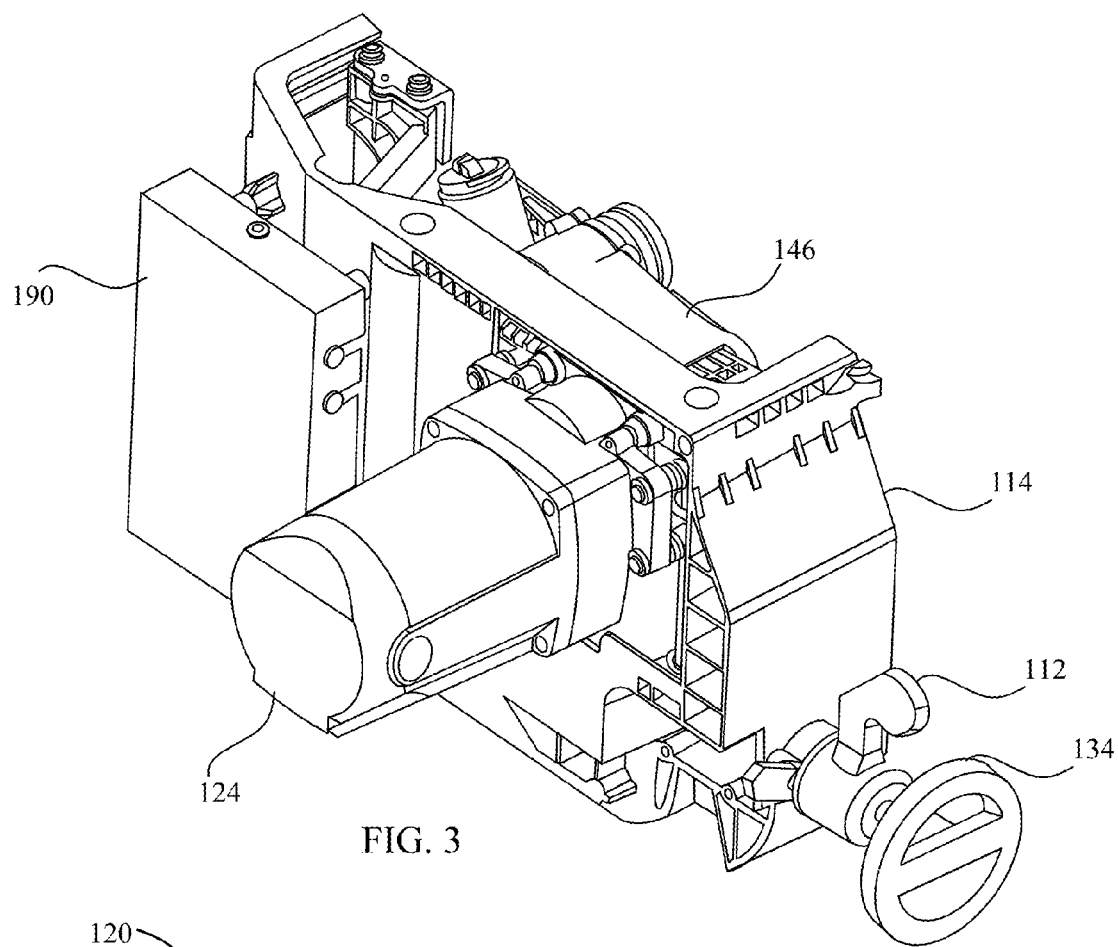
FIG. 3 depicts a perspective view of the table saw of FIG. 1 with the housing removed.

Referring to FIG. 1, a table saw 100 is shown with a base housing 102. The table saw 100 includes a work piece support surface 104. A riving knife or splitter 106 is positioned adjacent to a blade 108 which extends from within the base housing 102 to above the work-piece support surface 104. An anti-kickback assembly (not shown) and a blade guard (not shown) are attached to the riving knife 106 in some embodiments. The angle of the blade 108 with respect to the work-piece support surface 104 is established by pivoting a frame 114 (see FIGS. 2 and 3) within the base housing 102 using an angle setting mechanism 112.

Figure 4:
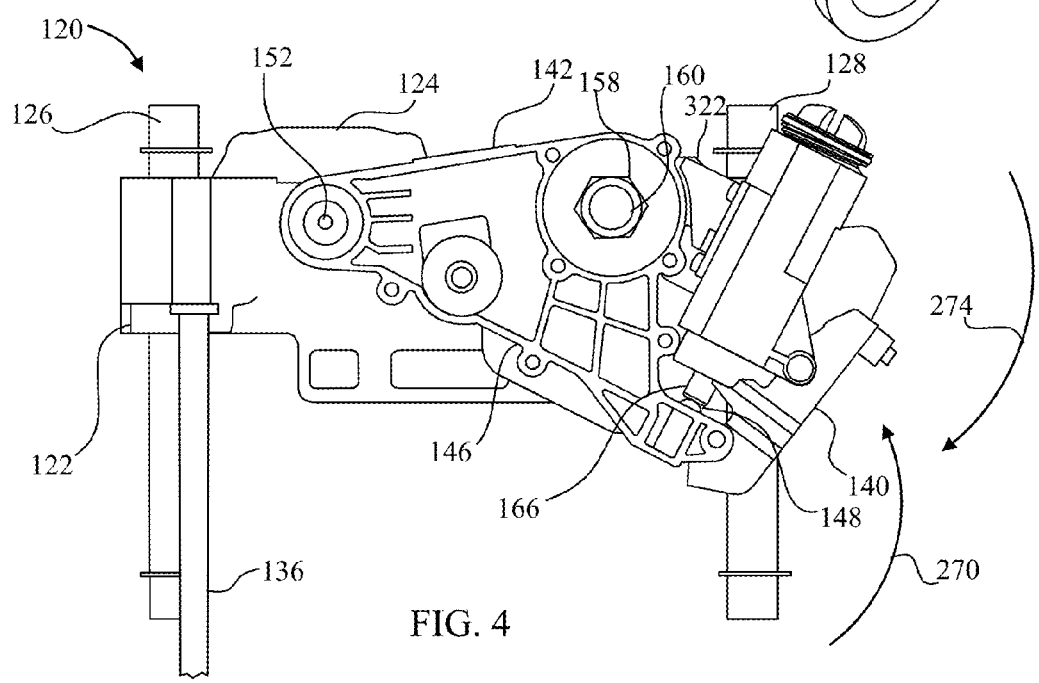
FIG. 4 depicts a side plan view of a carriage assembly, actuator, and latch assembly of the table saw of FIG. 1 with the swing arm assembly latched.
Figure 5:
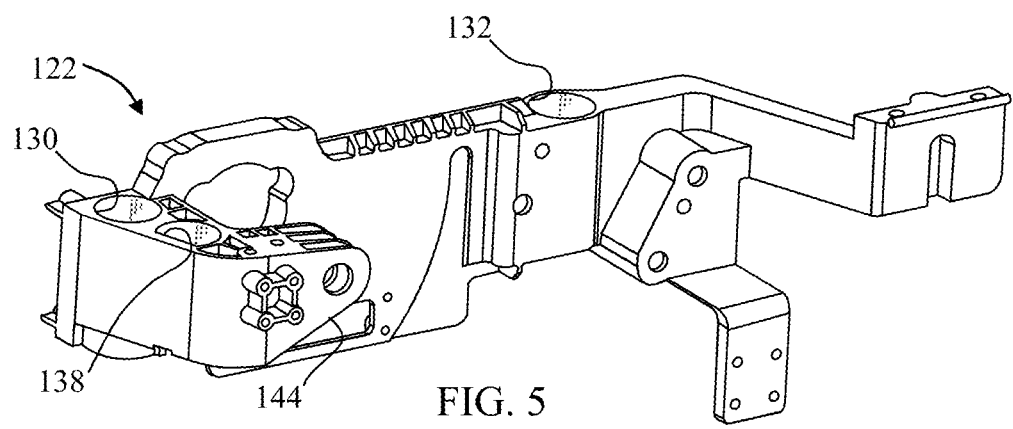
FIG. 5 depicts a side perspective view of the height adjustment carriage of FIG. 4.

The frame 114 supports a stop pad 116. The frame 114 further supports a carriage assembly 120 shown in FIG. 4. The carriage assembly 120 includes a carriage 122 (only a portion of which is shown in FIG. 4) which supports a motor 124 (see FIG. 3) which is powered through a power switch (not shown) located on the base housing 102. The carriage 122, also shown in FIG. 5, is slidably mounted on two guiderails 126/128 through guide rail bores 130/132. The position of the carriage 122 along the guiderails 126/128 is controlled by a blade height turn-wheel 134 (see FIG. 1) through a gearing assembly (not shown) which is connected to a screw post 136 which is received within a screw post bore 138. In some embodiments, the screw post bore 138 is positioned in locations other than that depicted in FIG. 5.

The carriage 122 pivotably supports a latch assembly 140. The carriage 122 also pivotably supports a swing arm assembly 142 on a swing arm support 144. The swing arm assembly 142, also shown in FIGS. 6 and 7, includes a swing arm 146. A strike bolt 148 is mounted on the swing arm 146. The swing arm 146 encloses a power wheel 150 that is driven by an output shaft 152 of the motor 124. A belt 154 transfers rotational movement from the power wheel 150 to a blade wheel 156. A nut 158 (see FIG. 7) is used to affix the blade 108 (not shown in FIGS. 6 and 7 for purpose of clarity) to a shaft 160 of the blade wheel 156. A tensioner 162 maintains the belt 154 at a desired tension.

Figure 6:
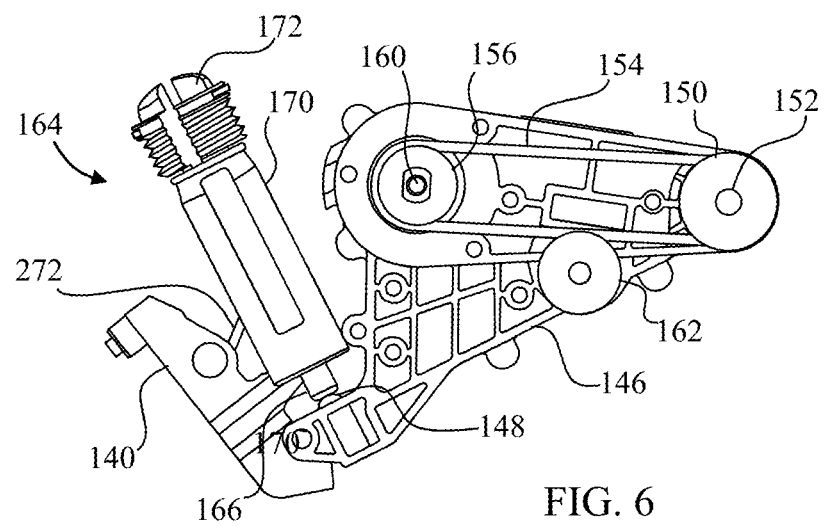
FIG. 6 depicts a side plan view of the swing arm assembly, actuator, and latch assembly of the table saw of FIG. 4 with the swing arm assembly latched.

A actuator assembly 164 is an actuating assembly which includes a actuator pin 166 which is aligned with the strike bolt 148 when the swing arm assembly 142 is in a latched position as depicted in FIGS. 4 and 6. The actuator assembly 164, in the embodiment of FIGS. 4 and 6, is a pyrotechnically activated system wherein a pyrotechnic charge is positioned within a receptacle which in this embodiment is a cylinder portion 170 which is closed at one end by a cap 172. Operation of the actuator assembly 164 is controlled by a mitigation and control system 180 depicted in FIG. 8.

The mitigation and control system 180 includes a sensing system 182, a controller 184, the motor 124, and the actuator assembly 164. The sensing system 182 in different embodiments is any desired sensing circuit. One acceptable sensing system is a part of the sensing and control circuit described in U.S. Pat. No. 6,922,153, the entire contents of which are herein incorporated by reference. The safety detection and protection system described in the '153 patent senses an unsafe condition and provides a sense signal indicative of the sensed unsafe condition.

Figure 9A:
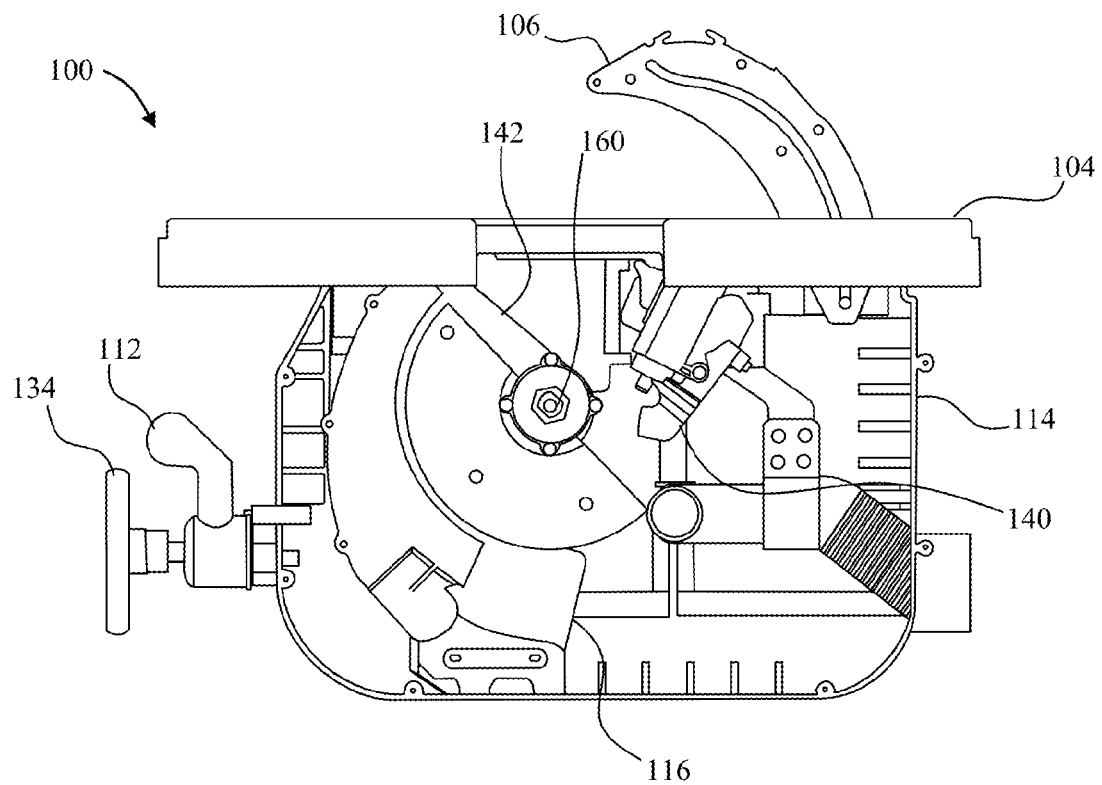
FIG. 9A depicts a side plan view of the table saw of FIG. 1 with the housing removed and the swing arm assembly in an unlatched position.
Figure 9C:
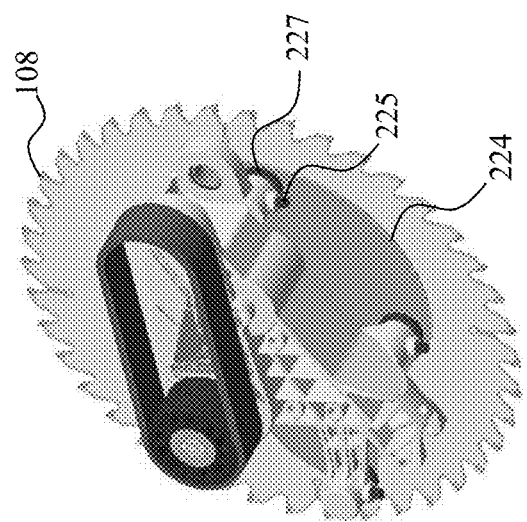
FIGS. 9B and 9C depicts a set screw and bushing which provides manual adjustment and isolation of the CCP.

The controller 184 one embodiment comprises a microprocessor, ASIC or other type of processing unit. The controller 184 receives the sense signal from the sensor subsystem 182 and, in response to an unsafe condition, fires the actuator assembly 164 to force the blade 108 and swing arm assembly 142 from the latched position shown in FIGS. 1 and 4 to an unlatched position below the work piece support surface 104 as depicted in FIG. 9A. In one embodiment, the mitigation and control system 180 and other electronics are housed within an electronics housing enclosure 190 shown in FIG. 3.

Figure 7:
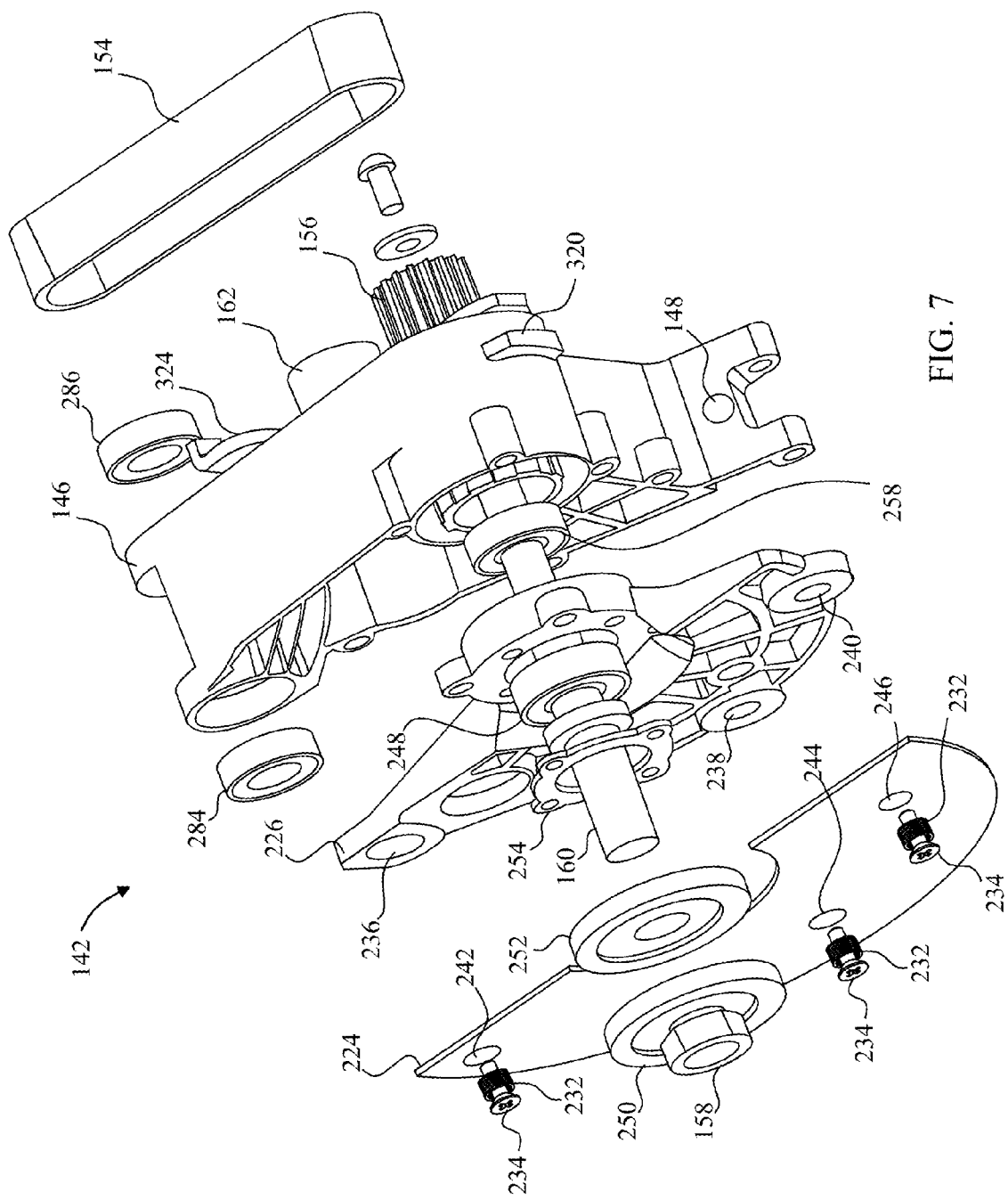
FIG. 7 depicts an exploded perspective view of the swing arm assembly of FIG. 4.

In one embodiment, the sensing system 182 includes a capacitive coupling plate (CCP) 224 shown in FIG. 7. The CCP 224 is a conductive material which, along with the blade 108, defines a capacitor. If a user touches the blade 108, the capacitance of the CCP 224/blade 108 capacitor is changed and the change in capacitance is provided as a sense signal to the controller 184. The CCP 224 is mounted to a CCP holder 226 using a spring 232, three springs 232 are illustrated, and screws 234. To mount the capacitive coupling plate 224 to the CCP holder 226, a spring 232 is placed into each of a plurality of spring wells 236, 238, and 240. The screws 234 are then inserted through mounting bores 242, 244, and 246, through the springs 232, and then threaded into the bottom portion of the spring wells 236, 238, and 240.

The springs 232 and screws 234 allow the capacitive coupling plate 224 to be precisely positioned with respect to the blade 108. In some embodiments, the CCP 224 is mounted using glue, a snap-in design, or by over-molding the CCP 224 with the CCP holder 226. In an alternative embodiment, a CCP is formed by using a conductive coating on a portion of the CCP holder 226. In other embodiments, the CCP 224 is mounted to the carriage 122.

Figure 9B:
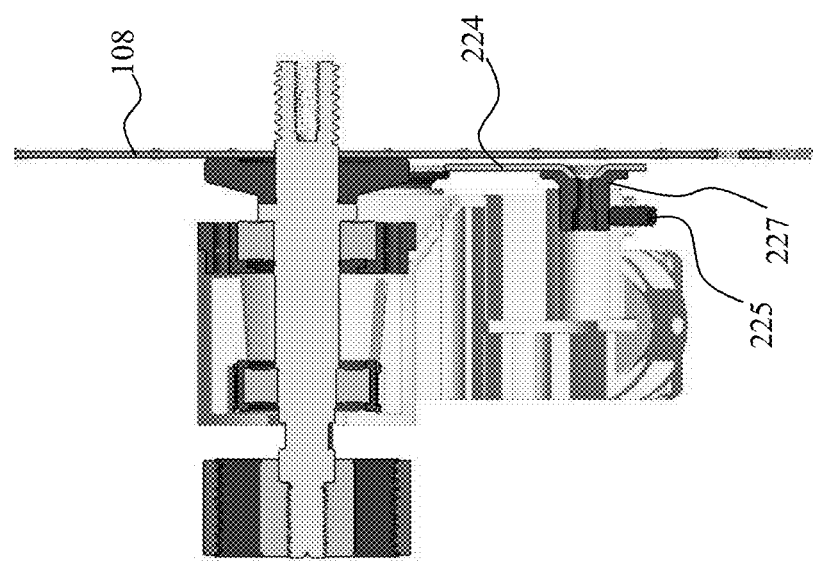

In some embodiments, a set screw is provided to move the plate 224 instead. By way of example, FIGS. 9B and C depict a set screw 225 within a bushing 227 which is used to keep the CCP air gap constant by manual adjustment of the CCP mounting location. The set screw 225 in one embodiment is used during manufacture of the table saw 100. The set screw 225 and bushing 227 thus provide manual control over the air gap and also provide isolation.

Figure 10:
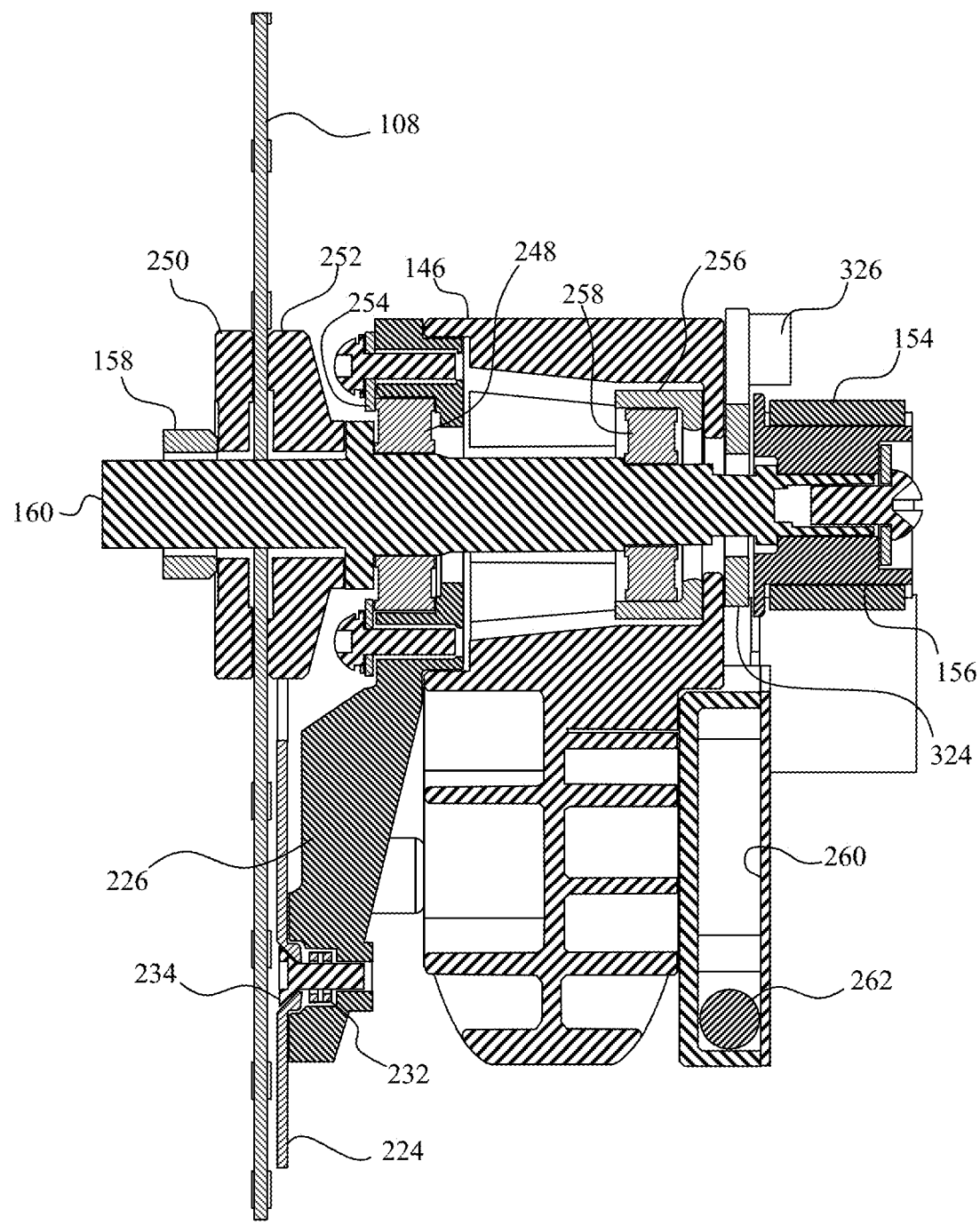
FIG. 10 depicts a front cross-sectional view through the blade wheel of the swing arm assembly of FIG. 4.

The assembled configuration of the swing arm assembly 142 is depicted in FIG. 10, wherein the blade 108 is precisely spaced apart from the capacitive coupling plate 224. Electrical isolation between the blade 108, the swing arm 142, the CCP 224, or a combination thereof is provided by the CCP holder 226 which is formed from a non-conductive material. The CCP holder 226 houses an output spindle bearing 248 which is in electrical contact with the shaft 160, blade washers 250/252, and the blade 108. The output spindle bearing 248 is maintained within the CCP holder 226 by a bearing retainer 254. In other embodiments, the output spindle bearing 248 is insert molded or pressed.

The blade/CCP capacitor is then formed by connecting cables (not shown) to the CCP 224. The shaft 160 is electrically isolated from the swing arm 146 by a back bearing isolator 256 which houses a spindle bearing 258. Additional electrical isolation is provided by the blade wheel 156 which is made of a non-conductive material. In some embodiments, the driving member 156 is formed from a material with metallic content to provide the mechanical strength required to handle the power transmission. For example, at least a portion of the content in some embodiments includes metallic/non-conductive, non-conductive/metallic/non-conductive, or the like. The insert can be over molded or made with alternate assembly insertion processes such as ultrasonic welding or the like.

Also shown in FIG. 10 is a shot box 260 in which one or more counterweights 262 is positioned. The counterweight 262 is sized to move freely within the shot box 260. The internal height of the shot box 260 is selected to be about the same as the maximum height of the blade 108 above the work piece support surface 104. In some embodiments, a resilient material is positioned within the shot box at the uppermost and lowermost locations. Further details of the mitigation and control system 180 and table saw 100 are provided in the following description of the operation of the table saw 100.

Operation of the table saw 100 is described with initial reference to FIGS. 1-4. Initially, the swing arm assembly 142 is maintained in a latched position with the swing arm 146 supported by the latch assembly 140 as shown in FIG. 4. In this position, the blade wheel 156 is positioned sufficiently close to the work-piece support surface 104 that the blade 108 extends above the work-piece support surface 104 as shown in FIG. 1. A user operates the angle setting mechanism 112 to pivot the frame 114 with respect to the work-piece support surface 104 to establish a desired angle between the blade 108 and the work-piece support surface 104. The user further operates the blade height adjustment turn-wheel 134 to move the carriage 122 along the guiderails 126/128 to establish a desired height of the blade 108 above the work-piece support surface 104.

Figure 8:
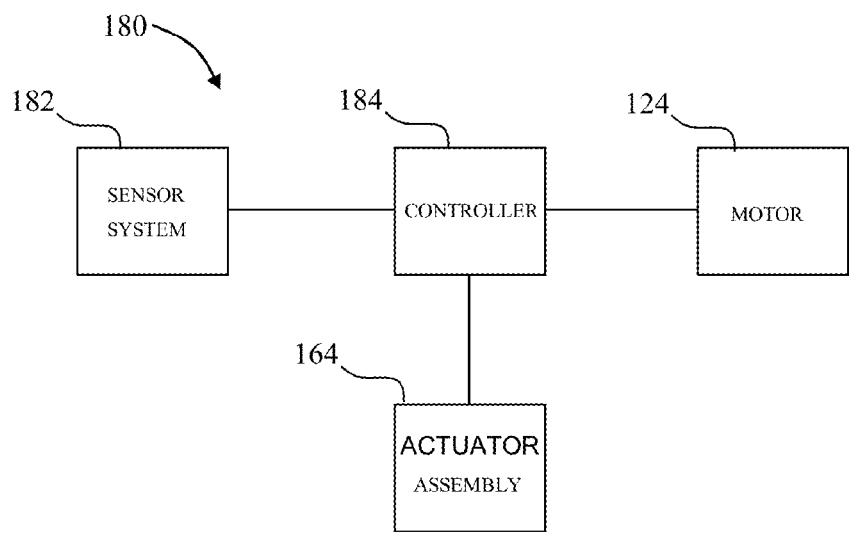
FIG. 8 depicts a schematic of a mitigation and control system of the table saw of FIG. 1.

Using the power switch (not shown), power is applied to the motor 124 under the control of the controller 184 (FIG. 8). In some embodiments, the controller 184 verifies that the actuator 170 is installed and functional and, once verified, power is applied to the motor 124 causing the output shaft 152 and the power wheel 150 to rotate. Rotation of the power wheel 150 causes the belt 154 to rotate the blade wheel 156 and the blade 108 which is mounted on the shaft 160 of the blade wheel 156. A work-piece may then be shaped by moving the work-piece into contact with the blade 108.

During operation of the table saw 100, the mitigation and control system 180 monitors for an unsafe condition using the sensor system 182. If an unsafe condition is detected, the controller 184 actuates the actuator assembly 164. Upon actuation of the actuator assembly 164, the actuator pin 166 is forced outwardly from the actuator assembly 164. When the swing arm assembly 142 is maintained in a latched position with the swing arm 146 supported by the latch assembly 140 as shown in FIG. 4, the strike bolt 148 is aligned with the actuator pin 166. Accordingly, as the actuator pin 166 is forced out of the actuator assembly 164, the actuator pin 166 impacts or impulses the strike bolt 148. The strike bolt 148 has a spherical or cylindrical profile. As the actuator pin 166 starts pushing the swing arm 146, the spherical strike bolt 148 keeps the actuator pin 166 in an in-line arrangement with the piston axis minimizing energy losses. In some embodiments, the end of the actuator pin 166 is also spherical. The actuator pin may be in other form of geometry.

The shape of the swing arm 146 and the latch assembly 140 is selected such that the impact or impulse of the actuator pin 166 on the strike bolt 148 generates a force tending to rotate the latch assembly 140 in the direction of the arrow 270 in FIG. 4 against a spring 272 (see FIG. 6). The action includes impact, impulse, or combination thereof. The spring constant of the spring 272 and the force generated by the actuator assembly 164 are selected such that when the actuator pin 166 acts on the strike bolt 148 the generated force is sufficient to compress the spring 272 and to force the latch assembly 140 to rotate into a position whereat the swing arm assembly 142 is no longer maintained in position adjacent to the latch assembly 140.

Consequently, the swing arm assembly 142 pivots about the output shaft 152 in the direction of the arrow 274 of FIG. 4 as the actuator pin continues to press against the strike bolt 148 such that the swing arm assembly 142 moves away from the work-piece support surface 104 to the position shown in FIG. 9A. Accordingly, the blade 108 (not shown in FIG. 9A for purpose of clarity) is pulled by the swing arm assembly 142 in a direction away from the work-piece support surface 104.

Figure 11A:
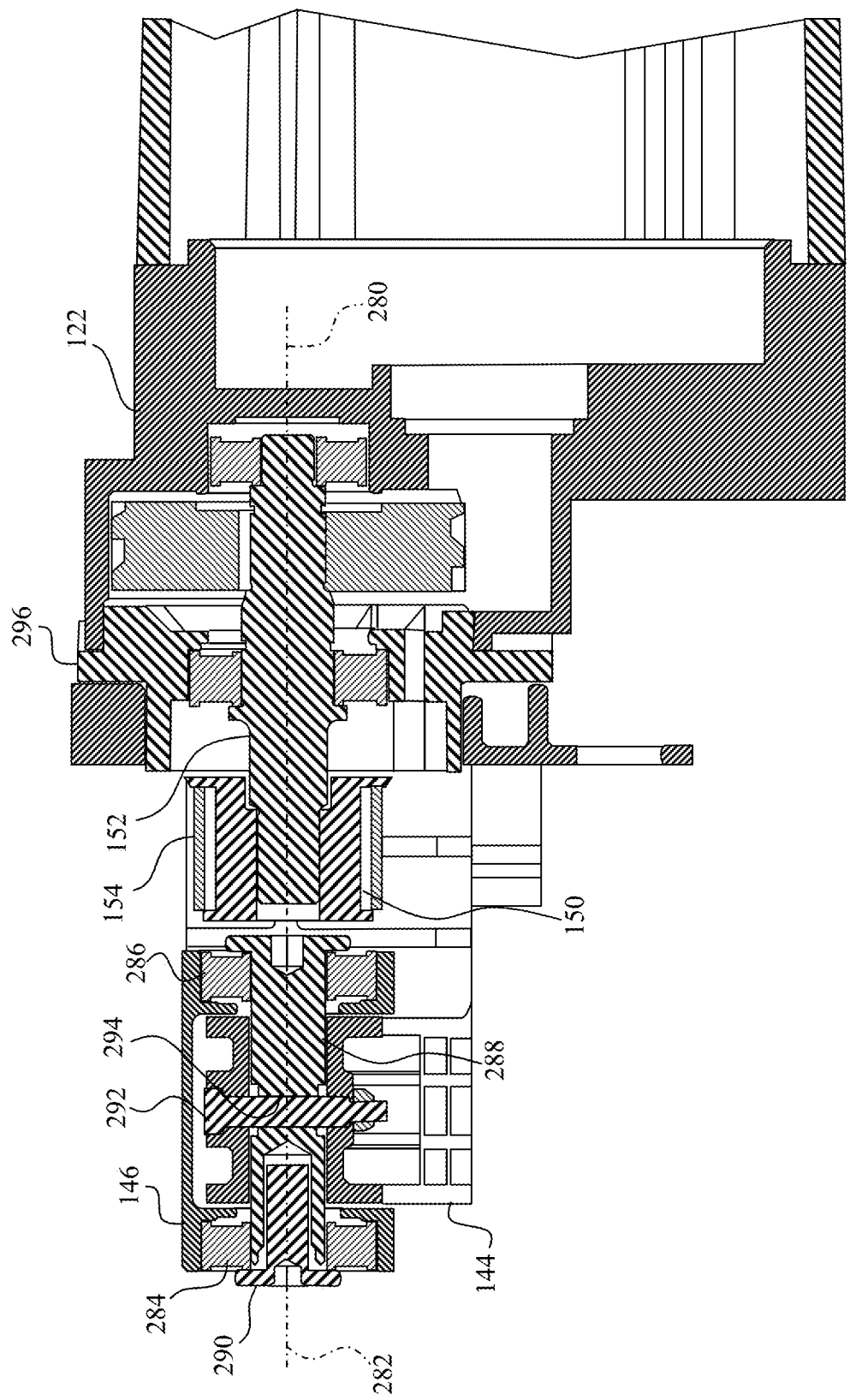
FIG. 11A depicts a front cross-sectional view through the power wheel of the swing arm assembly of FIG. 4.

The configuration of the swing arm assembly 142 provides improved efficiency of movement during the above described retraction of the blade 108 from a location above the work piece support surface 104. In one embodiment, the motor output axis 280 and the axis 282 of the swing arm 146 are co-axial even though the output shaft 152 and the swing arm 146 are not directly connected as shown in FIG. 11A. By having the axes co-axial, the belt 154 does not lose its tension after rotation. Also, the swing arm bearings 284/286 do not rotate with the motor shaft 152 which will increase the life of the swing arm bearings 284/286.

Also shown in FIG. 11A is a hinge shaft 288 which is used to pivotally connect the swing arm 146 and the swing arm support 144. A shaft bolt 290 pulls the inner races on swing arm bearings 284/286 toward each other. This minimizes the axial clearances of the swing arm bearings 284/286 which contributes to blade accuracy.

Figure 11B:
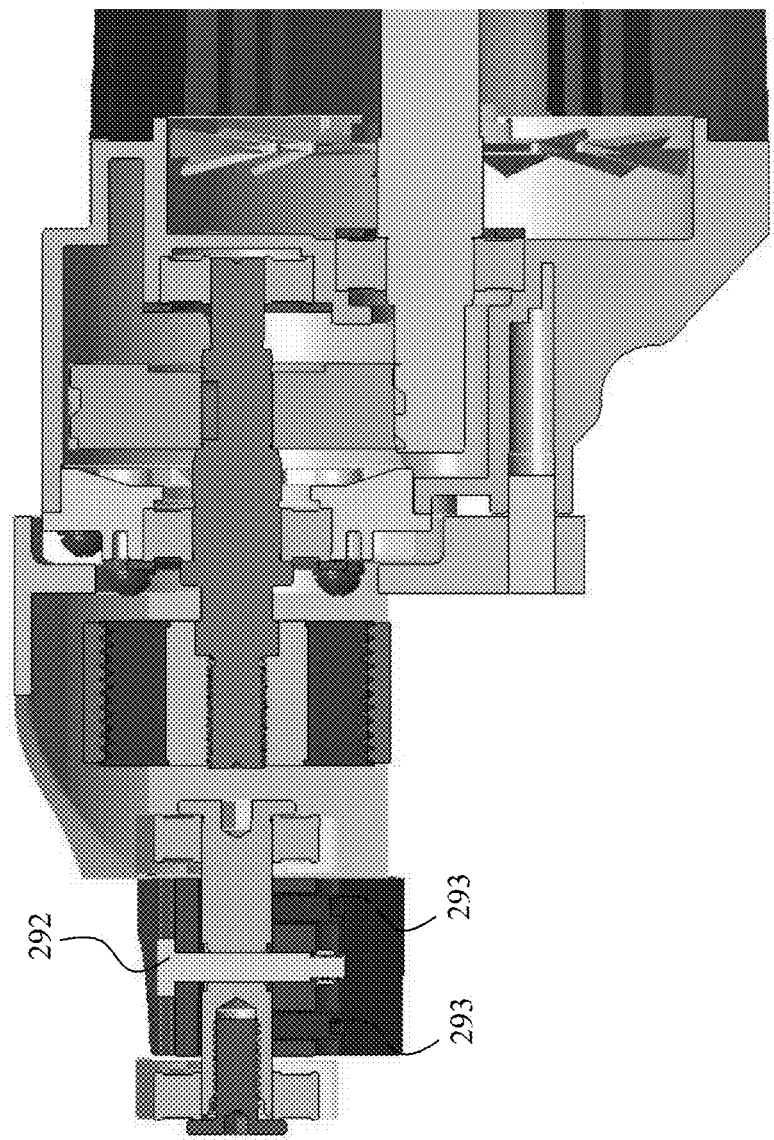
FIG. 11B depicts a front cross-sectional view through the power wheel of a swing arm assembly including set screws to eliminate the clearance between the hinge shaft and the hole in the carriage hinge section.

A blade positioning pin 292 extends through a bore 294 in the shaft bolt 290. The blade positioning pin 292 positions and creates the proper location of the swing arm 146 to the height adjustment carriage 122, thereby controlling the location and position of the blade 108. In some embodiments, one or more set screws are provided adjacent to the blade positioning pin 292. By way of example, FIG. 11B depicts set screws 293 positioned adjacent to the blade positioning pin 292. The set screws 293 are used to eliminate the clearance between the hinge shaft and the hole in the carriage hinge section.

Figure 11C:
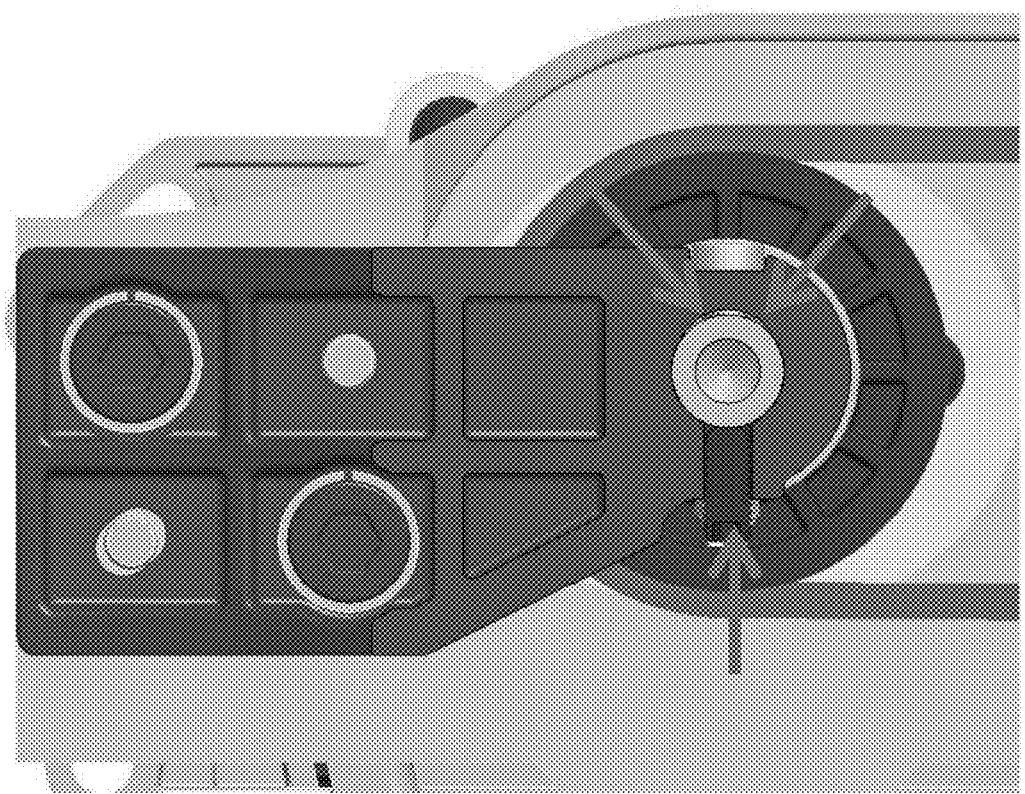
FIGS. 11C and D depict a swing arm assembly including a set screw and a carriage hole formed along two offset arcs.
Figure 11D:
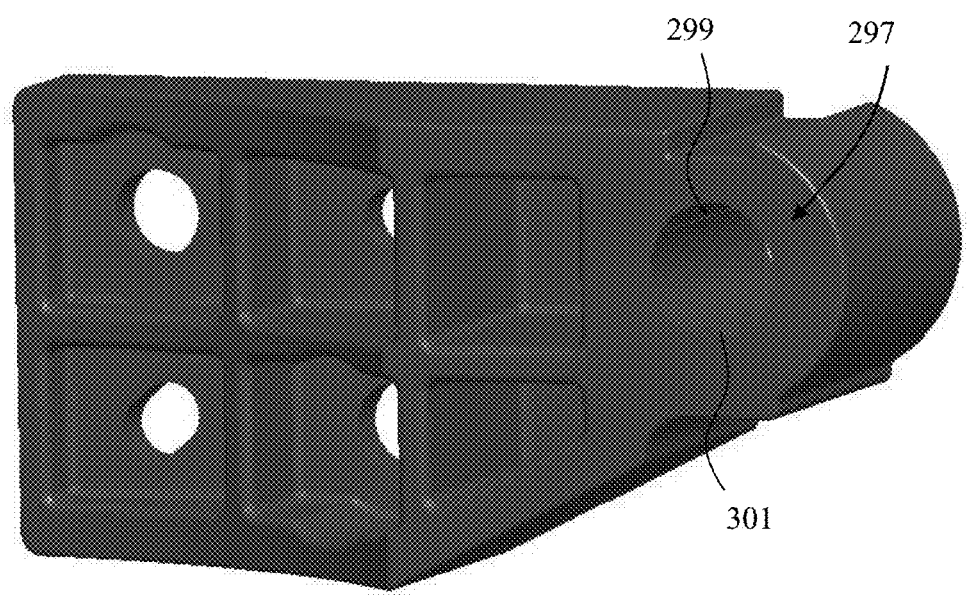

In the embodiment depicted in FIG. 11C, a single set screw 295 is used to eliminate the clearance between the hinge shaft and the hole in the carriage hinge section. In this embodiment, the hole 297 in the carriage includes an upper portion 299 which is formed on an arc having an origin that is offset from the origin of a lower portion 301 (see FIG. 11D). Thus, when a force is applied to the shaft by the set screw 295 (see FIG. 11C), a three point clamp is formed.

FIG. 11A further shows electrical isolation is provided by the power wheel 150 which is made of a non-conductive material which contains a metallic insert to provide the mechanical strength required to handle the power transmission. Alternatively, the power wheel 150 can be metallic and non-conductive material. The insert can be over molded or made with alternate assembly insertion processes such as ultrasonic welding or the like. Additional electrical isolation is provided by an isolator bearing plate 296 located between the carriage 122 and the swing arm 146.

Stopping of the swing arm 146 after the blade 108 is retracted below the work piece support surface 104 is also enhanced in the table saw 100. Specifically, as the support arm 146 is forced downwardly by the actuator pin 166, the counterweight 262 (see FIG. 10) is not initially accelerated. As the shot box 260 is rotated by the swing arm 146, the upper portion of the shot box 260 comes into contact with the counterweight 262 which slows the movement of the swing arm 146. As discussed above, the height of the shot box 260 is selected such that this slowing occurs only after the blade 108 has been retracted to a location below the work piece support surface 104.

Thus, when the support arm 146 comes into contact with the stop pad 116, some slowing of the swing arm 146 has already been effected. Thus, the stop pad 116 is more effective in further slowing the swing arm 146. Additionally, in the event that the swing arm 146 rebounds off of the stop pad 116, the above sequence is reversed with the counterweight 262 contacting the bottom of the shot box 260. The counterweight 262 thus dampens movement of the support arm 146 without interfering with the initial movement of the swing arm 146.

In the embodiment of FIG. 10, the counterweight 262 is a sphere. In other embodiments, the counterweight is any desired geometry. Both the shot box 260 and the counter weight 262 are made of material strong enough to take the impact force of the counterweight. In some embodiments, the shot box 260 and/or the counterweight 262 include a resilient material to absorb some of the energy of the moving counterweight.

Figure 12:
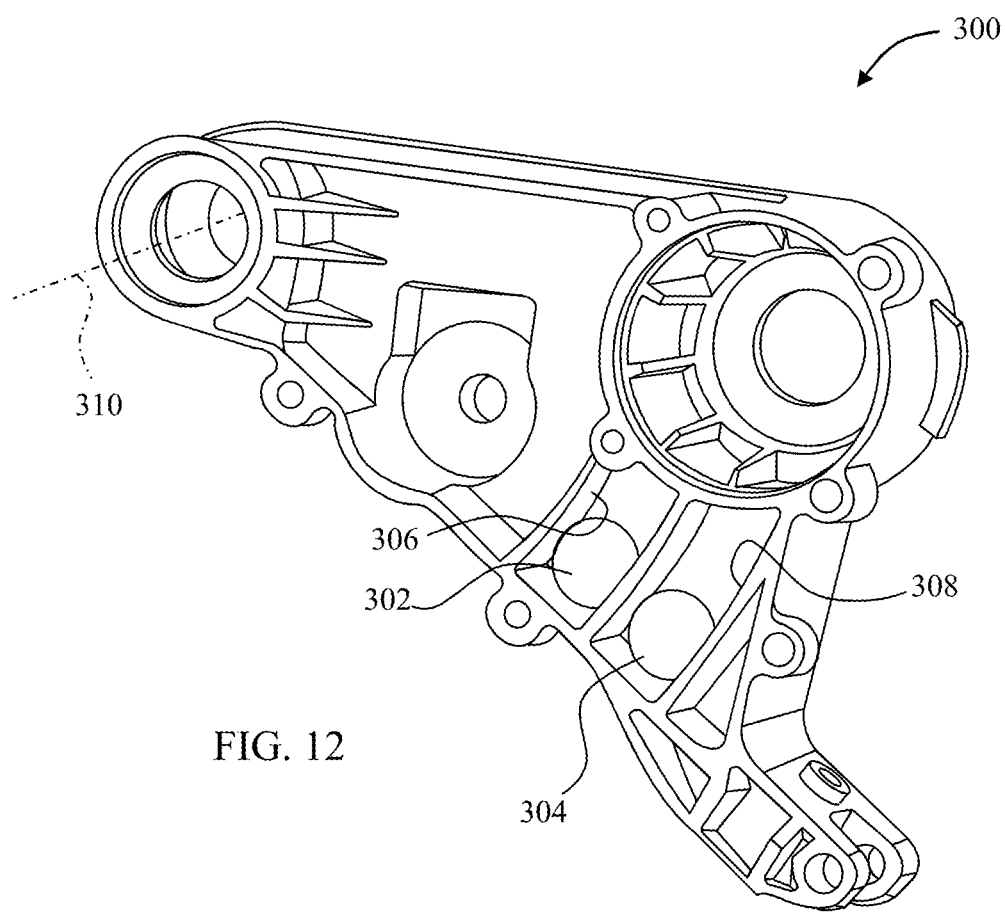
FIG. 12 depicts a side perspective view of a swing arm including multiple shot boxes for multiple counterweights.

Additionally, while FIG. 10 shows a single counterweight 262, other embodiments include additional counterweights. The number, weight, and location of the counterweights is selected to optimize the damping efficiency of the counterweights. By way of example, FIG. 12 depicts a swing arm 300 which includes two counterweights 302/304 within shot boxes 306/308 formed integrally with the swing arm 300. The shot boxes 306/308 are slightly arcuate to be complementary with the movement of the swing arm 300 along a swing path, and the distance from the axis of rotation 310 of the swing arm is selected to provide the desired moment arm for the desired damping effect.

The configuration of the table saw 100 is selected to also enhance resetting the swing arm 146 after the sensed condition has been cleared. In one embodiment, the power wheel 150 and the blade wheel 156 have the same diameter (same gear ratio). This prevents the blade 108 from changing speeds during dropping. When using a blade wrench or other lever arm for reset of the swing arm, the selected diameters of the power wheel 150 and the blade wheel 156 provides a straight-up pull motion. The belt 154 will roll around the same diameter pulley keeping the wrench in the same orientation during reset.

Additionally, the swing arm 146 is provided with an alignment member 320 as depicted in FIG. 7. As the swing arm 146 is being reset, the alignment member 320 comes into contact with an alignment receptacle 322 mounted to the actuator assembly 164 (see FIGS. 4 and 13). Mating of the alignment member 320 and the alignment receptacle 322 provides increased blade accuracy. The shape of the alignment member 320 is rectangular. In other embodiments, the alignment member 320 is any other desired geometrical shape such as triangular or circular. In a further embodiment, two cylindrical pins on top of each other are used to minimize friction.

Figure 13:
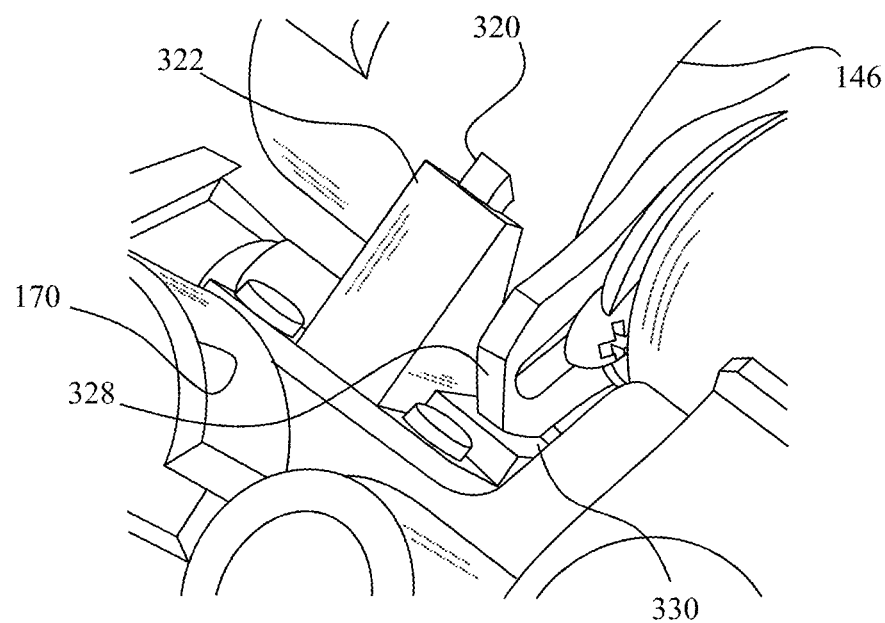
FIG. 13 depicts a partial top perspective view of the swing arm of FIG. 4 latched and secured with a spindle lock.

The table saw further includes a spindle lock 324 shown most clearly in FIGS. 7, 10, and 13. The spindle lock 324 includes an actuator 326 and a locking lip 328. A user uses the actuator 326 to move the spindle lock 324 forwardly into a locked position whereat the locking lip 328 rests upon a locking ledge 330 which is part of the alignment receptacle 322 in one embodiment as shown in FIG. 13. When the locking lip 328 rests upon the locking ledge 330, the swing arm 146 is mechanically locked against unlatching. Thus, the blade 108 may be changed without the chance of accidentally becoming unlatched.

The spindle lock 324 also locks the shaft 160 against rotation, easing the process of changing blades. In one embodiment, movement of the spindle lock 324 into the locked position disables the provision of power to the motor 124. Upon return of the spindle lock 324 to an unlocked position, the swing arm 146 may be unlatched by the mitigation and control system 180 and power may be supplied to the motor 124.

Figure 14A:
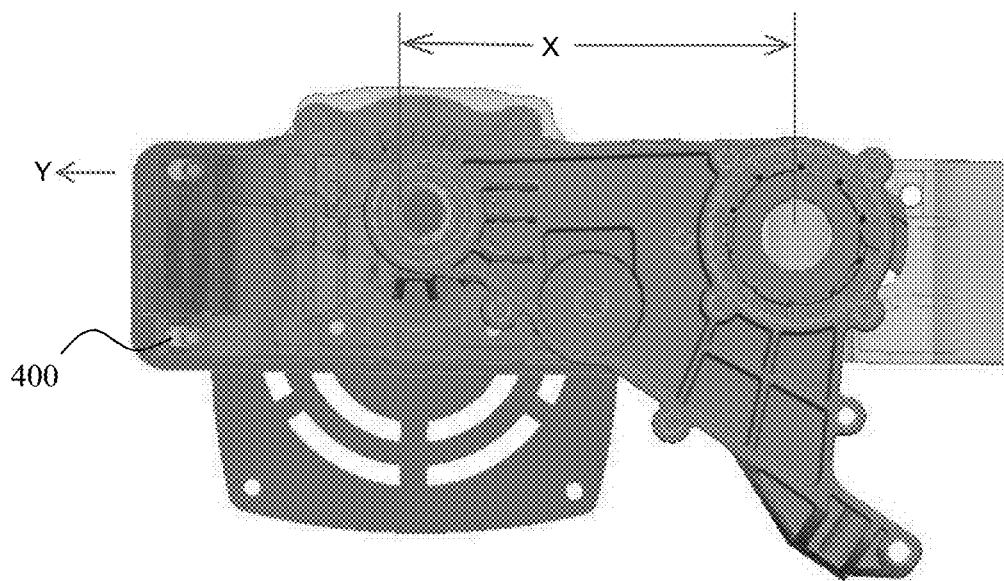
FIGS. 14A and B depict a linear horizontal belt adjustment configuration.
Figure 14B:
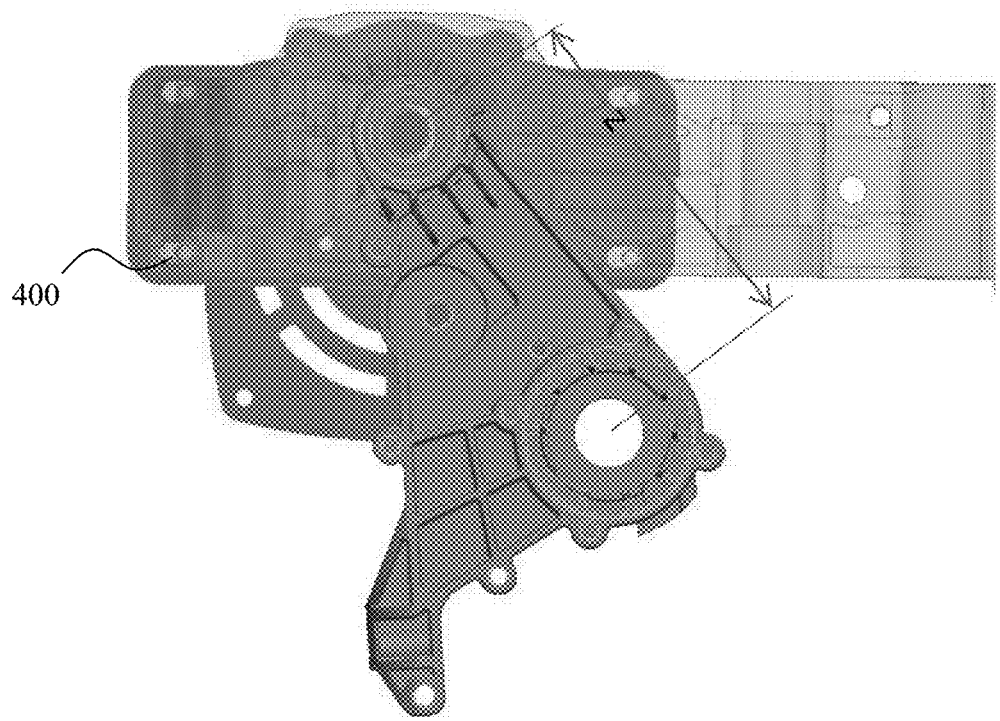

In some embodiments, the driving member does not include an idle pulley (tensioner) 162. In these embodiments, the axis of rotation is of the swing arm is not coaxial with the axis of rotation of the power wheel 150. By way of example, FIGS. 14A and B depict a linear horizontal belt adjustment configuration 400. In one embodiment, the nominal distance between the axis of rotation of the power wheel 150 and the blade wheel 156 is X when the swing arm is latched and can be modified by up to Y which is less than X as depicted in FIG. 14A so that the proper tension is achieved for the transmission. When the swing arm rotates to an angle θ that allows the blade to be positioned below the table, the nominal distance between the axis of rotation of the power wheel 150 and the blade wheel 156 is Z that is less than X as depicted in FIG. 14B. Rotational de-tensioning allows the motor shaft to move away from the hinge axis. After rotation, the belt is loosened making the belt change over easier.

The linear horizontal belt adjustment configuration provides ease of assembly with adjustment provided using a set screw. The set screw locks the gear housing from sliding in the tension direction. The only connections to the height adjustment carriage are four holding screws. Of course, the screws may lose the clamping tension due to plastic creep.

Figure 15A:
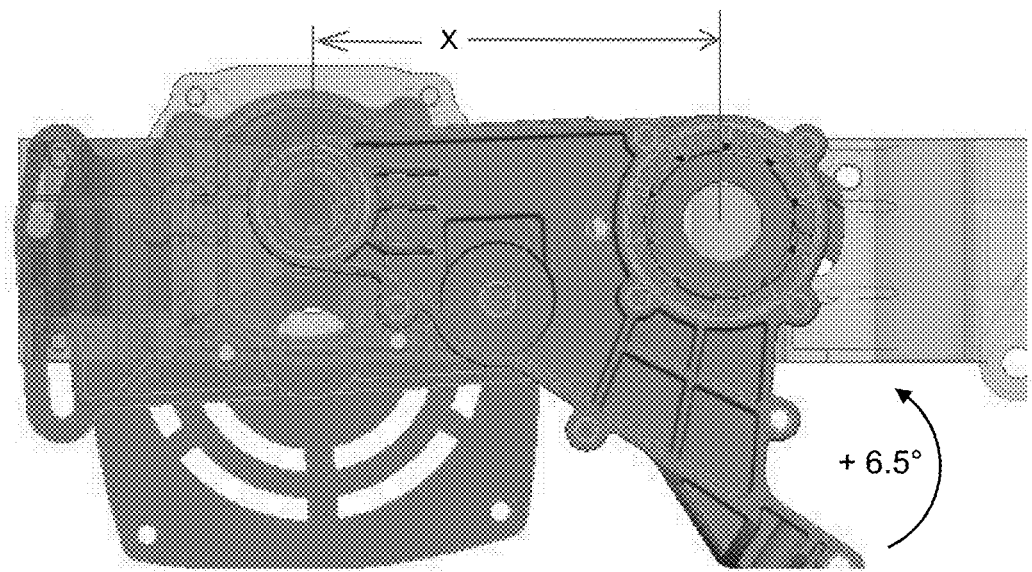
FIGS. 15A and B depict a rotational belt adjustment configuration.
Figure 15B:
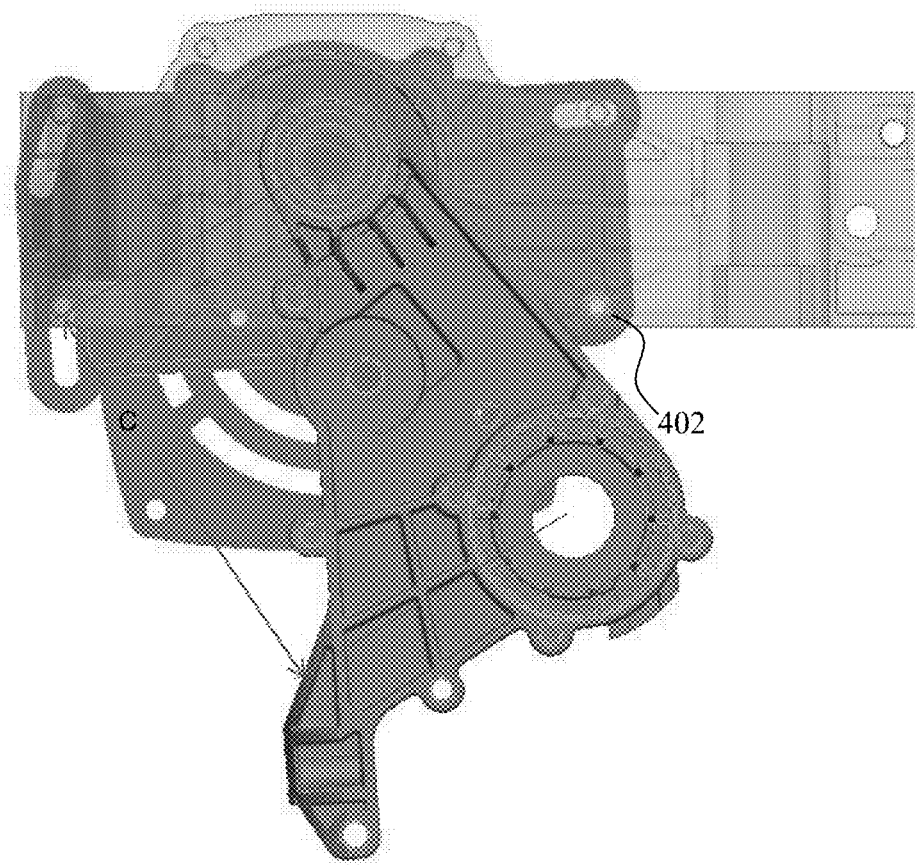

FIGS. 15A and B depict a rotational belt tension adjustment configuration. In this embodiment, the nominal distance between the axis of rotation of the power wheel 150 and the blade wheel 156 is X when the swing arm is latched (see FIG. 15A) and can be modified by up to B by 6.5 degrees rotation about a pivot 402 (see FIG. 15B). When the swing arm rotates 50°, the nominal distance between the axis of rotation of the power wheel 150 and the blade wheel 156 is C and center distance reduction is D as depicted in FIG. 15B.

The rotational belt adjustment configuration allows the set screw to lock the gear housing from rotating in the tension direction.

Figure 16A:
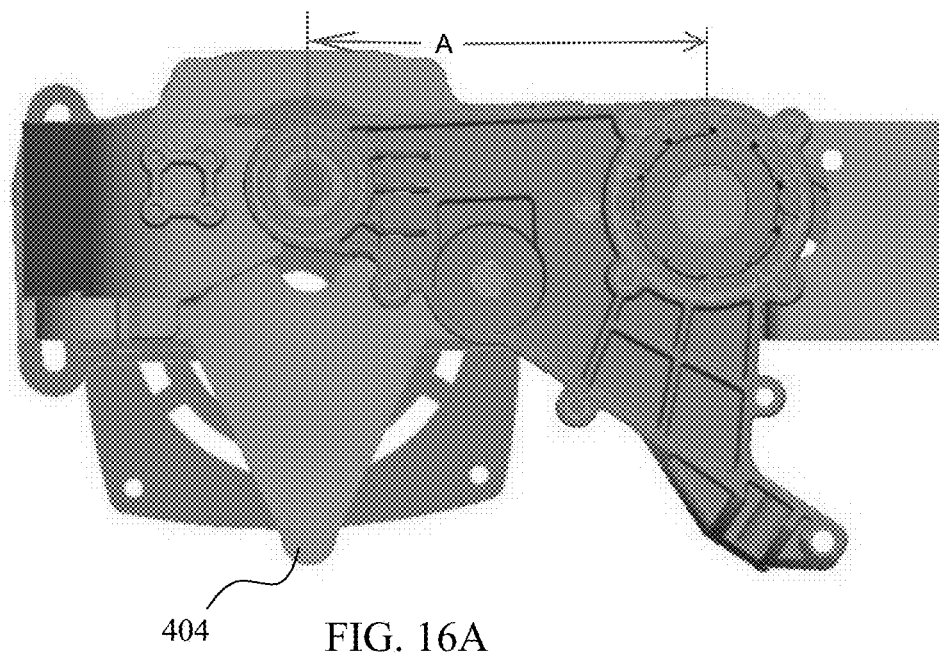
FIGS. 16A and B depict a pivot belt adjustment configuration.
Figure 16B:
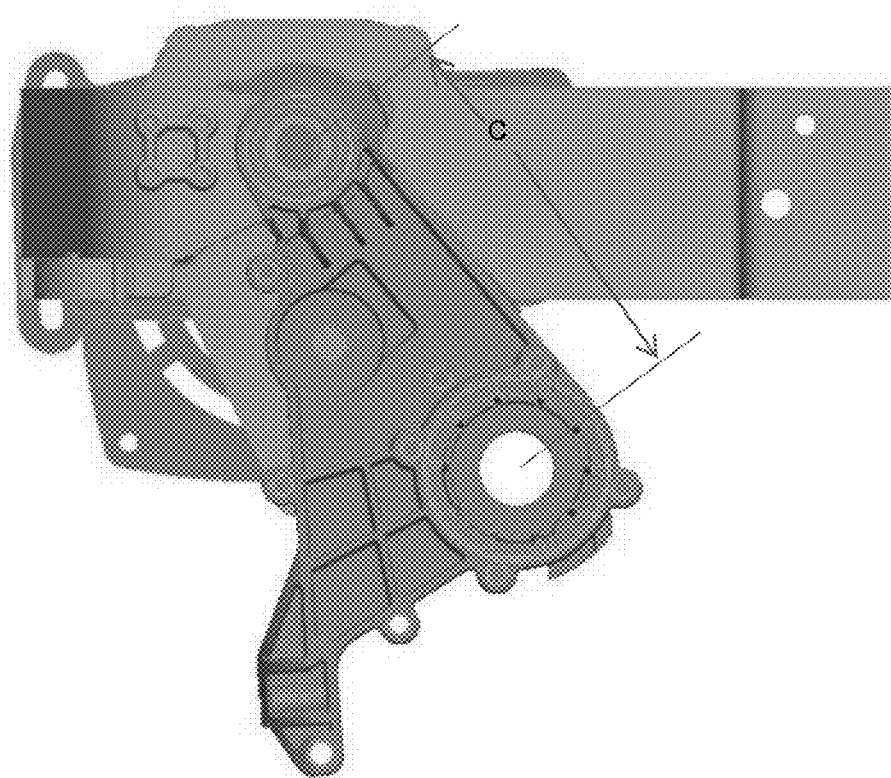

FIGS. 16A and B depict a rotational belt tension adjustment configuration. In this embodiment, the nominal distance between the axis of rotation of the power wheel 150 and the blade wheel 156 is A when the swing arm is latched (see FIG. 16A) and can be modified by up to B by 2.2 degrees rotation about a pivot 404. A shoulder screw is used to allow the pivot and the pivot point is moved to clear the motor housing. When the swing arm rotates 50°, the nominal distance between the axis of rotation of the power wheel 150 and the blade wheel 156 is C and center distance reduction is D as depicted in FIG. 16B.

Changing the pivot point of the driver pulley adjustment vertically, minimizes the center distance variation after the swing arm drops. This embodiment requires a larger height adjustment carriage.

FIGS. 17A and B depict a rotational belt tension adjustment configuration. In this embodiment, the nominal distance between the axis of rotation of the power wheel 150 and the blade wheel 156 is A when the swing arm is latched (see FIG. 17A) and can be modified by up to B by 4.1 degrees rotation about a pivot 406. A Press dowel pin in the height adjustment carriage is provided to allow pivoting and the pivot point is moved to clear the motor housing. A −8.5° rotation changes the distance between axes by C for fitting. When the swing arm rotates 50°, the nominal distance between the axis of rotation of the power wheel 150 and the blade wheel 156 is D and center distance reduction is E as depicted in FIG. 17B.

Changing the pivot point of the driver pulley adjustment vertically, minimizes the center distance variation after the swing arm drops and moving the tensioning pivot point closer to the driver pulley center reduces the required height of the height adjustment carriage. Additional bearing plate to height adjustment carriage mechanical support is used in some embodiments.

The above described rotational tensioning allows the motor shaft to move away from the hinge axis. After rotation, the belt will loosen making the belt change over easier.

In one embodiment, a driving system is mounted to at least one of the motor and swing arm. The driving system includes a first driving element coupled to the swing arm and a second driving element coupled to the motor. The pulley is part of the swing arm. Bearing is integral to the motor shaft wherein the bearing is the second driving element. drive system and drop system.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A table saw, comprising:
   a swing arm movable along a swing arm path between a first swing arm position adjacent a latch hold mechanism and a second swing arm position spaced apart from the latch hold mechanism;
   a blade supported by the swing arm;
   a charge coupling plate holder supported by the swing arm;
   a charge coupling plate mounted to the charge coupling plate holder with a plurality of screws and having a plurality of springs located between the charge coupling plate and the charge coupling plate holder, the charge coupling plate electrically isolated from the swing arm by the charge coupling plate holder and mounted in close proximity to the blade so as to form a capacitor;
   an actuating device configured to transfer a force to the swing arm when the swing arm is maintained at the first swing arm position resulting in a bias on the latch hold mechanism; and
   a control system configured to control the actuating device to transfer the force to the swing arm in response to a sensed change in capacitance of the capacitor.

2. The table saw of claim 1, further comprising:
   at least one shot box operably connected to the swing arm; and
   at least one counterweight located within the at least one shot box and configured to move within the at least one shot box.

3. The table saw of claim 2, wherein the at least one shot box is integrally formed with the swing arm.

4. The table saw of claim 2, wherein the at least one shot box is arcuately shaped.

5. The power tool of claim 4, further comprising:
   at least one shot box operably connected to the swing arm; and
   at least one counterweight located within the at least one shot box and configured to move within the at least one shot box.

6. The power tool of claim 5, wherein the shaping device is a saw blade.

7. The table saw of claim 1, further comprising:
   a work support surface;
   a carriage movable with respect to the work support surface and including a swing arm support;
   a hinge shaft supported by the carriage;
   a first bearing supported by the hinge shaft and rotatably supporting the swing arm;
   a second bearing supported by the hinge shaft and rotatably supporting the swing arm; and
   a shaft bolt configured to engage the hinge shaft such that the first bearing is forced toward the second bearing.

8. The table saw of claim 7, further comprising:
   at least one shot box operably connected to the swing arm; and
   at least one counterweight located within the at least one shot box and configured to move within the at least one shot box.

9. The table saw of claim 1, wherein each of the plurality of screws extends at least partially within a respective one of the plurality of springs.

10. The table saw of claim 1, wherein:
    the charge coupling plate holder includes a plurality of spring wells; and each of the plurality of springs is positioned at least partially within a respective on of the plurality of spring wells.

11. The table saw of claim 10, wherein:
    each of the plurality of spring wells includes a respective threaded bottom portion; and
    each of the plurality of screws is threaded into a respective one of the respective threaded bottom portions.

12. The table saw of claim 11, wherein each of the plurality of screws extends at least partially within a respective one of the plurality of springs.

13. A power tool, comprising:
    a swing arm movable along a swing arm path between a first swing arm position adjacent a latch hold mechanism and a second swing arm position spaced apart from the latch hold mechanism;
    a shaping device supported by the swing arm;
    a charge coupling plate holder supported by the swing arm;
    a charge coupling plate mounted to the charge coupling plate holder with a plurality of screws and having a plurality of springs located between the charge coupling plate and the charge coupling plate holder, the charge coupling plate electrically isolated from the swing arm by the charge coupling plate holder and mounted in close proximity to the shaping tool so as to form a capacitor;
    an actuating device configured to transfer a force to the swing arm when the swing arm is maintained at the first swing arm position resulting in a bias on the latch hold mechanism; and
    a control system configured to control the actuating device to transfer the force to the swing arm in response to a sensed change in capacitance of the capacitor.

14. The power tool of claim 13, further comprising:
    at least one shot box operably connected to the swing arm; and
    at least one counterweight located within the at least one shot box and configured to move within the at least one shot box.

15. The power tool of claim 14, wherein the at least one shot box is integrally formed with the swing arm.

16. The power tool of claim 14, wherein the at least one shot box is arcuately shaped.

17. The power tool of claim 13, further comprising:
    a work support surface;
    a carriage movable with respect to the work support surface and including a swing arm support;
    a hinge shaft supported by the carriage;
    a first bearing supported by the hinge shaft and rotatably supporting the swing arm;
    a second bearing supported by the hinge shaft and rotatably supporting the swing arm; and
    a shaft bolt configured to engage the hinge shaft such that the first bearing is forced toward the second bearing.

18. The power tool of claim 13, wherein each of the plurality of screws extends at least partially within a respective one of the plurality of springs.

19. The power tool of claim 13, wherein:
    the charge coupling plate holder includes a plurality of spring wells; and
    each of the plurality of springs is positioned at least partially within a respective on of the plurality of spring wells.

20. The power tool of claim 19, wherein:
    each of the plurality of spring wells includes a respective threaded bottom portion; and
    each of the plurality of screws is threaded into a respective one of the respective threaded bottom portions.

* * * * *